(12) United States Patent
Momoi et al.

(10) Patent No.: US 11,435,617 B2
(45) Date of Patent: Sep. 6, 2022

(54) LIGHT FLUX CONTROLLING MEMBER, LIGHT-EMITTING DEVICE, SURFACE LIGHT SOURCE DEVICE AND DISPLAY DEVICE

(71) Applicant: Enplas Corporation, Saitama (JP)

(72) Inventors: Takuro Momoi, Saitama (JP); Hiroshi Takatori, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/528,356

(22) Filed: Nov. 17, 2021

(65) Prior Publication Data

US 2022/0163851 A1 May 26, 2022

(30) Foreign Application Priority Data

Nov. 20, 2020 (JP) .............................. JP2020-193521

(51) Int. Cl.
*G02F 1/00* (2006.01)
*G02F 1/1335* (2006.01)
*G02F 1/13357* (2006.01)

(52) U.S. Cl.
CPC .. *G02F 1/133607* (2021.01); *G02F 1/133603* (2013.01)

(58) Field of Classification Search
None
See application file for complete search history.

(56) References Cited

U.S. PATENT DOCUMENTS

| | | | |
|---|---|---|---|
| 2014/0167594 A1 | 6/2014 | Kim et al. | |
| 2014/0168999 A1* | 6/2014 | Li | G02B 3/02 362/338 |
| 2015/0260371 A1* | 9/2015 | Takatori | F21V 7/0066 362/307 |
| 2017/0031210 A1* | 2/2017 | Kim | G02B 19/0071 |
| 2017/0115531 A1* | 4/2017 | Hiraka | G02F 1/133606 |
| 2017/0328537 A1* | 11/2017 | Fukuda | G02B 19/0028 |

* cited by examiner

*Primary Examiner* — Gerald J Sufleta, II (57) ABSTRACT

A light flux controlling member includes a first optical surface, a second optical surface, a third optical surface, and a fourth optical surface. A part of light emitted from the light-emitting element and entered from the first optical surface is emitted from the second optical surface to outside of the light flux controlling member after being sequentially internally reflected by the second optical surface, the third optical surface and the fourth optical surface. A part of light emitted from the light-emitting element that is incident on the first optical surface is Fresnel-reflected, reflected by a surface of the substrate toward the first optical surface to enter the light flux controlling member from the first optical surface, and then emitted from the second optical surface to the outside of the light flux controlling member.

17 Claims, 9 Drawing Sheets

LIGHT FLUX CONTROLLING MEMBER, LIGHT-EMITTING DEVICE, SURFACE LIGHT SOURCE DEVICE AND DISPLAY DEVICE

CROSS REFERENCE TO RELATED APPLICATIONS

This application is entitled to the benefit of Japanese Patent Application No. 2020-193521, filed on Nov. 20, 2020, the disclosure of which including the specification, drawings and abstract is incorporated herein by reference in its entirety.

TECHNICAL FIELD

The present invention relates to a light flux controlling member that controls the distribution of light emitted from a light-emitting element, a light-emitting device including the light flux controlling member, a surface light source device including the light-emitting device, and a display device including the surface light source device.

BACKGROUND ART

In recent years, in transmissive image display devices such as liquid crystal display devices, direct surface light source devices including a plurality of light-emitting elements as a light source are used. In addition, in some direct surface light source devices, a large number of light-emitting elements are disposed for the purpose of wide irradiation of light.

PTL 1 discloses a surface light source device including a light-emitting element disposed on a substrate and provided with a light-emitting surface with a predetermined size, and a light flux controlling member, and a diffusion member. The light flux controlling member includes an incidence surface for allowing incidence of light emitted from the light-emitting element, a reflecting surface that reflects a part of the light entered from the incidence surface in the direction along the substrate and transmits the other part of the light, and an emission surface that emits the light reflected by the reflecting surface. The reflecting surface reflects, in the direction along the substrate, the light emitted from the vicinity of the center of the light-emitting surface and entered from the incidence surface. On the other hand, a part of light emitted from a region apart from the center of the light-emitting surface and entered from the incidence surface is not reflected by the reflecting surface, but is emitted from the reflecting surface to the outside of the light flux controlling member.

In the surface light source device disclosed in PTL 1, the light emitted from light-emitting element is spread by the light flux controlling member to illuminate a wide range of the diffusion member. The light emitted from the light flux controlling member is further diffused by the diffusion plate. Thus, the surface light source device disclosed in PTL 1 can uniformly illuminate the planar display member (such as a liquid crystal panel).

CITATION LIST

Patent Literature

PTL 1
US Patent Application Publication No. 2014/167594

SUMMARY OF INVENTION

Technical Problem

In recent years, light-emitting elements whose light-emitting surface is smaller than the light-emitting surface of known light-emitting elements have been developed. When a light-emitting element with a small light-emitting surface is applied to the surface light source device disclosed in PTL 1, the majority of the light emitted from the light-emitting element is reflected by the reflecting surface and the amount of the light transmitted through the reflecting surface is reduced, and consequently, the display member may not be uniformly illuminated due to the resulting dark points in the region immediately above the light flux controlling member.

An object of the present invention is to provide a light flux controlling member that can suppress luminance unevenness even in the case where the light-emitting surface of the light-emitting element is small. In addition, another object of the present invention is to provide a light-emitting device including the light flux controlling member, a surface light source device including the light-emitting device and a display device including the surface light source device.

Solution to Problem

A light flux controlling member according to an embodiment of the present invention is configured to control a distribution of light emitted from a light-emitting element disposed on a substrate, the light flux controlling member includes: a first optical surface disposed facing the light-emitting element and configured to allow incidence of light emitted from the light-emitting element; a second optical surface disposed on a side opposite to the light-emitting element with the first optical surface between the second optical surface and the light-emitting element, and configured to reflect, in a lateral direction, a part of light entered from the first optical surface such that the part of light entered from the first optical surface travels away from an optical axis of the light-emitting element; a third optical surface where a part of light reflected by the second optical surface reaches; and a fourth optical surface extending in a direction away from the first optical surface to surround the first optical surface, the fourth optical surface being a surface where a part of light reflected by the third optical surface reaches. A part of light emitted from the light-emitting element and entered from the first optical surface is emitted from the second optical surface to outside of the light flux controlling member after being sequentially internally reflected by the second optical surface, the third optical surface and the fourth optical surface. A part of light emitted from the light-emitting element that is incident on the first optical surface is Fresnel-reflected, reflected by a surface of the substrate toward the first optical surface to enter the light flux controlling member from the first optical surface, and then emitted from the second optical surface to the outside of the light flux controlling member.

A light-emitting device according to an embodiment of the present invention includes: a light-emitting element disposed on a substrate; and the light flux controlling member according to an embodiment of the present invention disposed over the light-emitting element.

A light-emitting device according to an embodiment of the present invention includes: a plurality of light-emitting elements disposed on a substrate; and the light flux controlling member according to an embodiment of the present invention disposed over the plurality of light-emitting elements.

A surface light source device according to an embodiment of the present invention includes: a plurality of the light-emitting devices according to an embodiment of the present invention; and a light diffusion plate configured to transmit light emitted from the plurality of light-emitting devices while diffusing the light emitted from the plurality of light-emitting devices.

A display device according to an embodiment of the present invention includes: the surface light source device according to an embodiment of the present invention; and a display member configured to be irradiated with light emitted from the surface light source device.

Advantageous Effects of Invention

According to the present invention, it is possible to provide a light flux controlling member that can suppress luminance unevenness even in the case where the light-emitting surface of the light-emitting element is small. In addition, according to the present invention, it is possible to provide a light-emitting device, a surface light source device, and a display device including the light flux controlling member.

DESCRIPTION OF EMBODIMENTS

Embodiments of the present invention are elaborated below with reference to the accompanying drawings. In the following description, a surface light source device suitable for a backlight of a liquid crystal display device and the like is described as a typical example of a surface light source device according to an embodiment of the present invention. The surface light source device can be used as display device 100' (see FIG. 1B) when used in combination with display member 102 (such as a liquid crystal panel) configured to be irradiated with light from the surface light source device.

Embodiment 1

Configurations of Surface Light Source Device and Light-Emitting Device

Figure 1A:
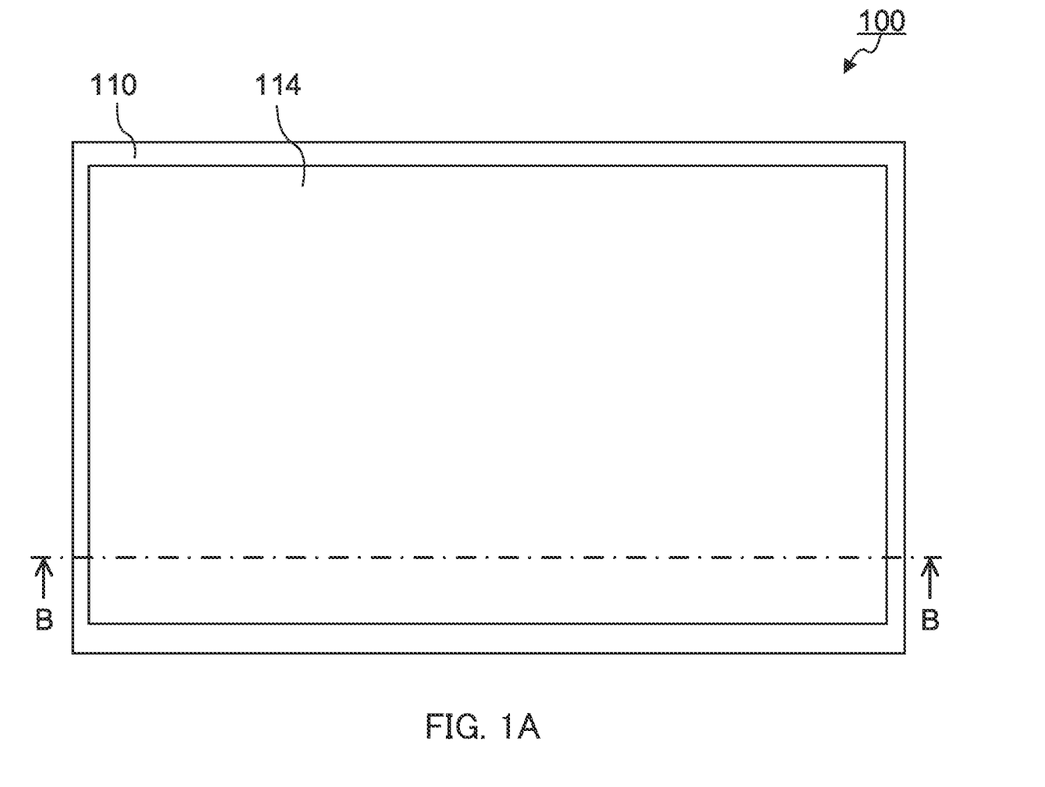
FIGS. 1A and 1B illustrate a configuration of a surface light source device according to Embodiment 1.
Figure 1B:
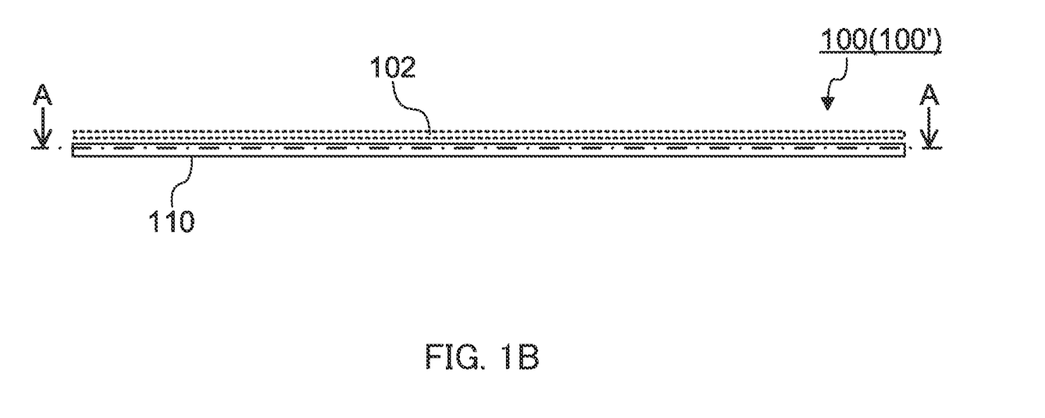
Figure 2A:
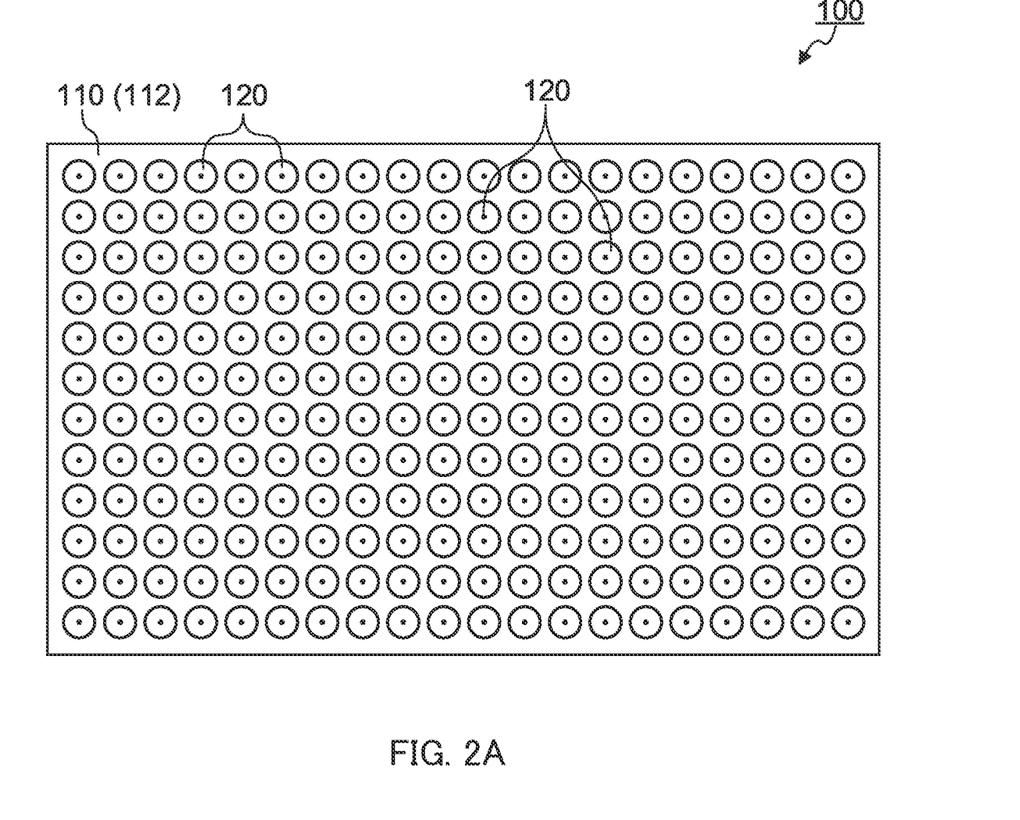
FIGS. 2A and 2B illustrate a configuration of the surface light source device according to Embodiment 1.
Figure 2B:
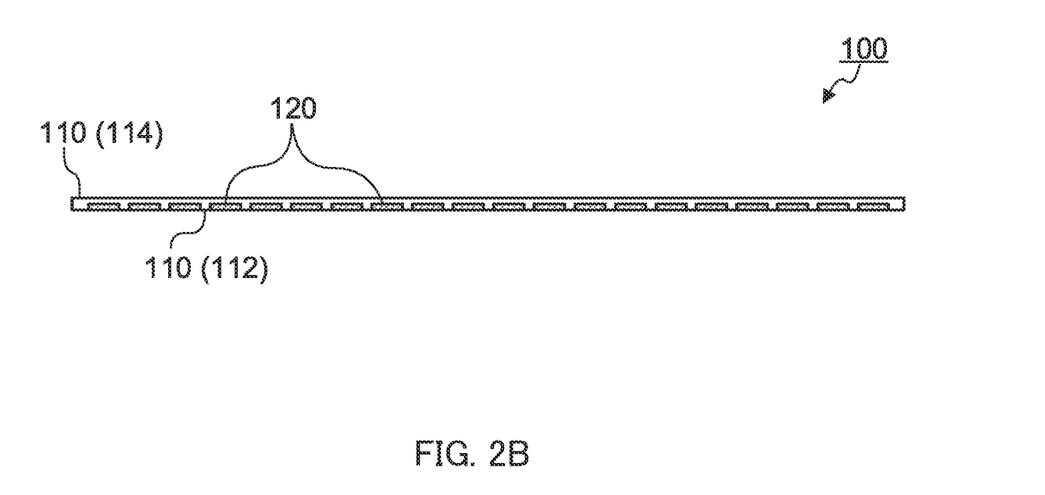
Figure 3:
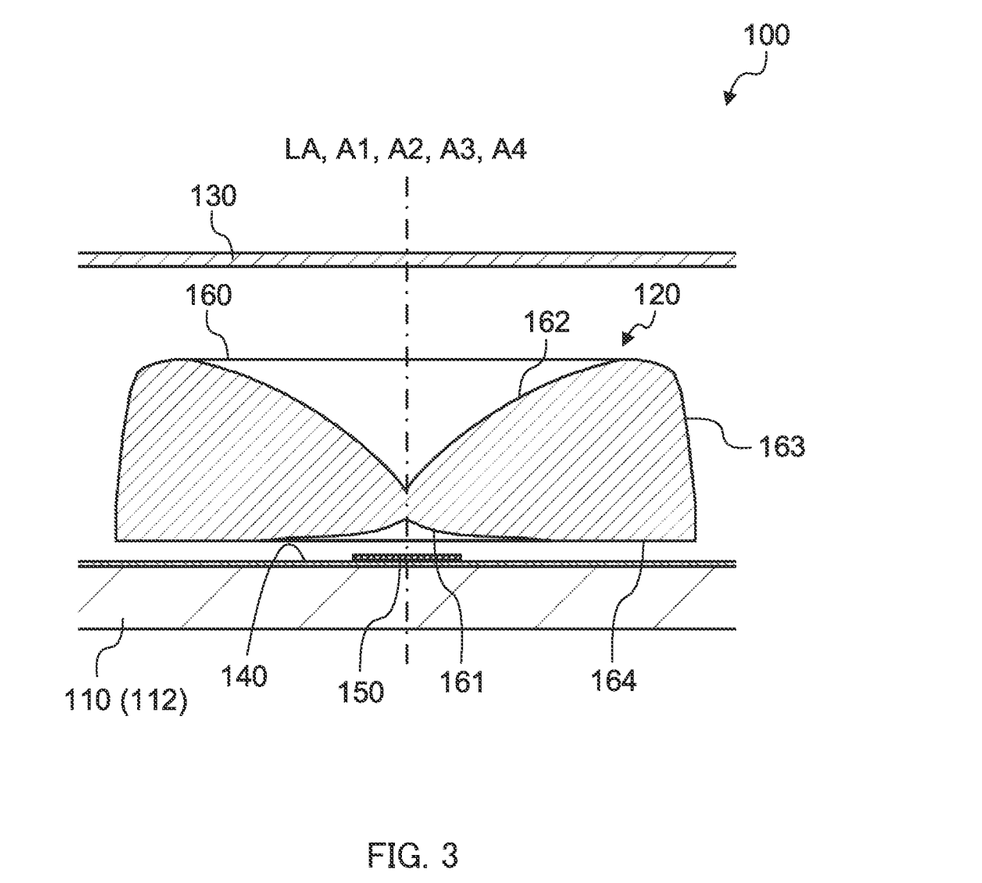
FIG. 3 is a partially enlarged view of FIG. 2B.

FIGS. 1A to 3 illustrate a configuration of surface light source device 100 according to Embodiment 1 of the present invention. FIG. 1A is a plan view of surface light source device 100 according to Embodiment 1, and FIG. 1B is a front view of surface light source device 100 according to Embodiment 1. FIG. 2A is a sectional view taken along line A-A of FIG. 1B, and FIG. 2B is a sectional view taken along line B-B of FIG. 1A. FIG. 3 is a partially enlarged sectional view of FIG. 2B. In FIG. 3, a leg part for fixing light flux controlling member 160 to substrate 140 is omitted.

As illustrated in FIGS. 1A to 3, surface light source device 100 according to the embodiment includes housing 110, a plurality of light-emitting devices 120, and a light diffusion plate 130. The plurality of light-emitting devices 120 is disposed in a matrix on bottom plate 112 of housing 110. The inner surface of bottom plate 112 functions as a diffusive reflection surface. In addition, top plate 114 of housing 110 is provided with an opening. Light diffusion plate 130 is disposed to close the opening, and functions as a light-emitting surface. The size of light-emitting surface is not limited, but is, for example, approximately 400 mm×approximately 700 mm. The distance between substrate 140 and light diffusion plate 130 is not limited. Note that the effects of the present invention are more easily achieved with thin surface light source device 100 with a small distance between substrate 140 and light diffusion plate 130. The region above light-emitting element 100 is more likely to be recognized as dark points in thin surface light source device 100 in which light from another light-emitting element 150 adjacent to one light-emitting element 150 less reaches the region of light diffusion plate 130 facing second optical surface 162 located above the one light-emitting element 150. Such a problem can be solved by using optical control member 160 of the embodiment of the present invention. In view of this, the distance between substrate 140 and light diffusion plate 130 is preferably in a range of 2 to 30 mm, more preferably in a range of 2 to 5 mm.

As illustrated in FIG. 3, light-emitting device 120 is fixed on substrate 140. Substrate 140 is fixed at a predetermined position on bottom plate 112 of housing 110. Light-emitting device 120 includes light-emitting element 150 and light flux controlling member 160.

Light-emitting element 150 is a light source of surface light source device 100 and is mounted on substrate 140. Light-emitting element 150 is, for example, a light-emitting diode (LED) such as a white light-emitting diode. In addition, the type of light-emitting element 150 is not limited. Preferably, light-emitting element 150 is light-emitting element 150 (such as a COB light-emitting diode) that emits light from the top surface and the side surface. In the present embodiment, light-emitting element 150 with a light-emitting surface smaller than the light-emitting surface of a known light-emitting element is used. The length of one side of the light-emitting surface is, for example, 0.1 to 1.0 mm.

Light flux controlling member 160 is an optical member that controls the distribution of light emitted from light-emitting element 150. Light flux controlling member 160 is fixed on substrate 140. Light flux controlling member 160 is disposed over light-emitting element 150 such that its first axis A1 coincides with light axis LA of light-emitting element 150. Note that in the present embodiment, light flux controlling member 160 is rotationally symmetrical about first axis A1 as the rotation axis. Light axis LA of light-emitting element 150 coincides with first axis A1 of first optical surface 161, second axis A2 of second optical surface 162, third axis A3 of third optical surface 163 and fourth axis A4 of fourth optical surface 164. In addition, "light axis LA of light-emitting element 150" means a central light beam of a stereoscopic emission light flux from light-emitting element 150. A gap for dissipating outward the heat emitted from light-emitting element 150 may be or may not be formed between substrate 140 where light-emitting element 150 is mounted and the rear surface of light flux controlling member 160.

Light flux controlling member 160 is formed by integral shaping. The material of light flux controlling member 160 is not limited as long as the material can transmit light of a desired wavelength. For example, the material of light flux controlling member 160 is an optically transparent resin such as polymethylmethacrylate (PMMA), polycarbonate (PC) and epoxy resin (EP), or glass.

A main feature of surface light source device 100 according to the present embodiment is the configuration of light flux controlling member 160. In view of this, light flux controlling member 160 is elaborated later.

Light diffusion plate 130 is a plate-shaped member with a light diffusibility, and transmits light emitted from light-emitting device 120 while diffusing the light. Normally, light diffusion plate 130 has substantially the same size as a display member such as a liquid crystal panel. For example, light diffusion plate 130 is formed of an optically transparent resin such as polymethylmethacrylate (PMMA), polycarbonate (PC), polystyrene (PS), and styrene methyl methacrylate copolymerization resin (MS). To provide light diffusibility, minute irregularity is formed the surface of light diffusion plate 130, or a light diffuser such as beads are dispersed inside light diffusion plate 130.

In surface light source device 100 according to the present embodiment, light emitted from each light-emitting element 150 is spread by light flux controlling member 160 so as to illuminate a wide range of light diffusion plate 130. Light emitted from each light flux controlling member 160 is further diffused by light diffusion plate 130. As a result, surface light source device 100 according to the present embodiment can uniformly illuminate the planar display member (e.g., a liquid crystal panel).

Configuration of Light Flux Controlling Member

Figure 4A:
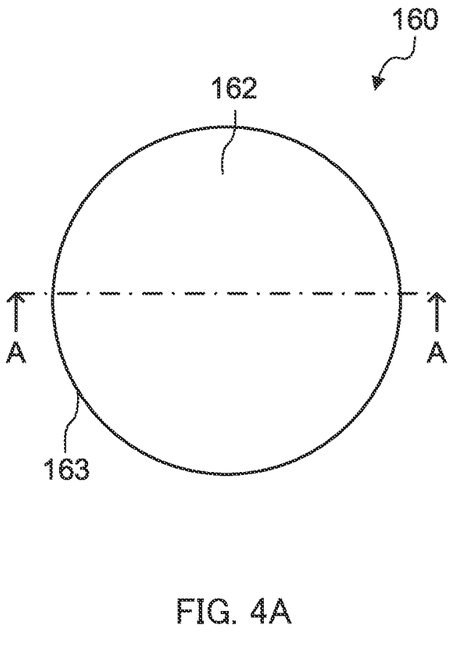
FIGS. 4A, 4B, 4C and 4D illustrate a configuration of a light flux controlling member according to Embodiment 1.
Figure 4B:
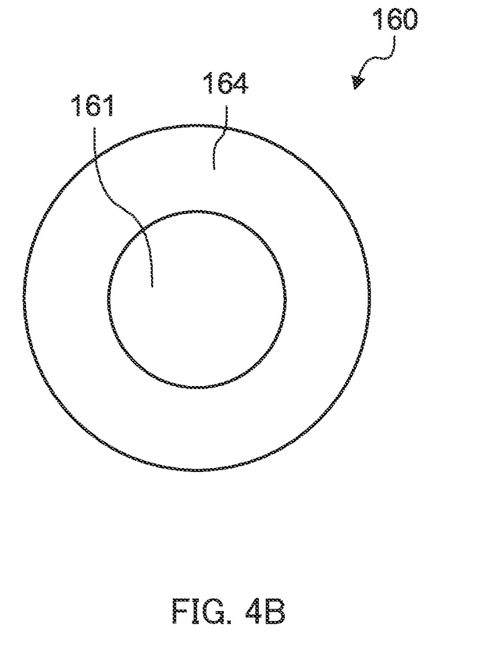
Figure 4C:
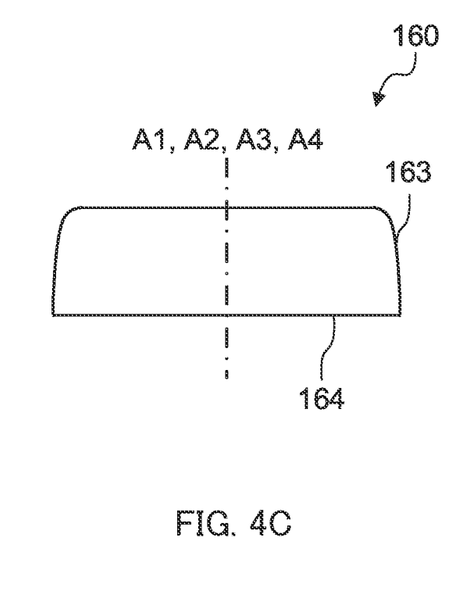
Figure 4D:
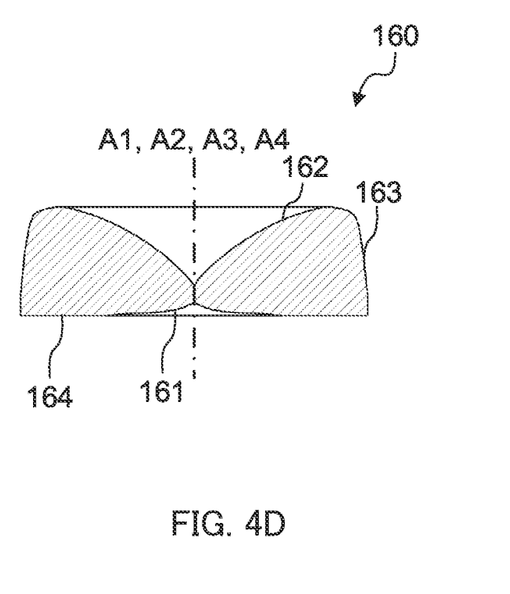

Now, a configuration of light flux controlling member 160 is described. FIG. 4A is a plan view of light flux controlling member 160, FIG. 4B is a bottom view of light flux controlling member 160, FIG. 4C is a front view of light flux controlling member 160, and FIG. 4D is a sectional view taken along line A-A of FIG. 4A.

As illustrated in FIGS. 4A to 4D, light flux controlling member 160 according to the present embodiment includes first optical surface 161, second optical surface 162, third optical surface 163, and fourth optical surface 164.

First optical surface 161 is disposed on the rear side so as to face light-emitting element 150. First optical surface 161 allows light emitted from light-emitting element 150 to enter light flux controlling member 160, transmits other arriving light, or reflects other arriving light. The shape of first optical surface 161 is not limited as long as the above-described function can be ensured. In the present embodiment, the shape of first optical surface 161 is an inner surface of a recess formed on the rear side of light flux controlling member 160. The shape of first optical surface 161 is a shape that intersects light axis LA of light-emitting element 150 and is rotationally symmetrical (circularly symmetrical) about first axis A1 of first optical surface 161. More specifically, in the present embodiment, the shape of first optical surface 161 is a shape formed such that the distance from substrate 140 gradually decreases as the distance from light axis LA of light-emitting element 150 increases. More specifically, the shape of first optical surface 161 is a shape in which the angle of the tangent to the optical axis gradually increases as the distance from light axis LA increases. First optical surface 161 may include a region where the incident angle, at first optical surface 161, of light emitted from the center of the light-emitting surface of light-emitting element 150 is 60 degrees or greater. When the angle is 60 degrees or greater, a part of the light emitted from light-emitting element 150 is reflected at first optical surface 161, but, even in such a case, light flux controlling member 160 according to the present embodiment can appropriately control the light distribution.

Second optical surface 162 is disposed at a position (front side) opposite to light-emitting element 150 with first optical surface 161 therebetween. Second optical surface 162 internally reflects, in the direction along the surface of substrate 140, light entered from first optical surface 161, or transmits a part of other arriving light. Second optical surface 162 is not limited as long as the above-mentioned function can be ensured. In the present embodiment, the shape of second optical surface 162 is a shape that interests light axis LA of light-emitting element 150 and is rotationally symmetrical (circularly symmetrical) about second axis A2 of second optical surface 162. More specifically, the shape of second optical surface 162 is a shape configured to such that the distance from substrate 140 increases as the distance from light axis LA of light-emitting element 150 increases. With such a shape, second optical surface 162 prevents the generation of a bright spot in the region immediately above light-emitting element 150 by suppressing upward direct passage of light emitted from light-emitting element 150 and entered from first optical surface 161, and prevents the generation of a dark point in the region between each light-emitting element 150 by guiding the light to the region between each light-emitting element 150.

The generatrix from the center to the outer periphery of the rotationally symmetrical shape is a curve or a straight line inclined with respect to second axis A2 of second optical surface 162. Second optical surface 162 is a recessed surface obtained by rotating generatrix 360 degrees with second axis A2 as the rotation axis.

As described above, in the present embodiment, light-emitting element 150 whose light-emitting surface is smaller than the light-emitting surface of known light-emitting element 150 is used. In the present embodiment, the size of the light-emitting surface of light-emitting element 150 is extremely small with respect to second optical surface 162. More specifically, in plan view, the ratio of the area of second optical surface 162 and the area of the light-emitting surface of light-emitting element 150 is preferably in a range of 80:1 to 5:1. In the case where the ratio is outside the above-mentioned range, the amount of the light that travels to the region immediately above light flux controlling member 160 may become large, and a bright spot may be generated in the region immediately above light flux controlling member 160.

Third optical surface 163 is connected to second optical surface 162 and fourth optical surface 164. Third optical surface 163 internally reflects light reflected by second optical surface 162 toward substrate 140 (fourth optical surface 164), or transmits other arriving light. In the present embodiment, third optical surface 163 is a side surface of light flux controlling member 160 and is disposed outside than second optical surface 162. Third optical surface 163 is not limited as long as the above-mentioned function can be ensured. In the present embodiment, the shape of third optical surface 163 is rotationally symmetrical (circularly symmetrical) about third axis A3 of third optical surface 163. More specifically, in the present embodiment, the shape of third optical surface 163 is approximately parallel to third axis A3.

Fourth optical surface 164 is the rear surface of light flux controlling member 160, and extends in a direction away from fourth axis A4 of fourth optical surface 164 so as to surround first optical surface 161. Fourth optical surface 164 reflects, toward second optical surface 162, a part of the light reflected by third optical surface 163. In the present embodiment, fourth optical surface 164 is connected to the outer edge of first optical surface 161, and is disposed to be approximately parallel to the light-emitting surface of light-emitting element 150. In the present embodiment, third optical surface 163 is connected to the outer edge of fourth optical surface 164.

Light Distribution Characteristics

Figure 5A:
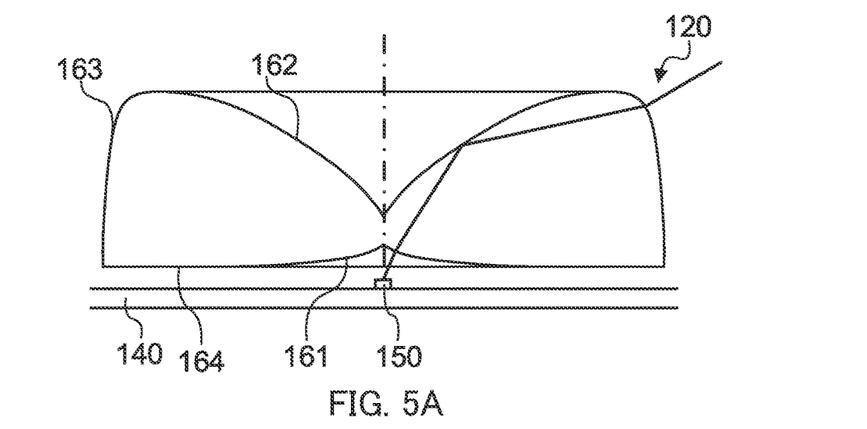
FIGS. 5A, 5B and 5C illustrate light paths of a light-emitting device according to Embodiment 1.
Figure 5B:
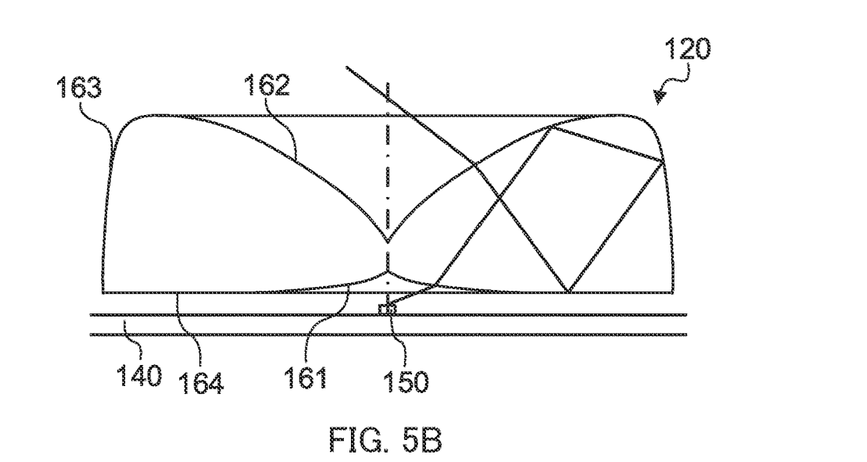
Figure 5C:
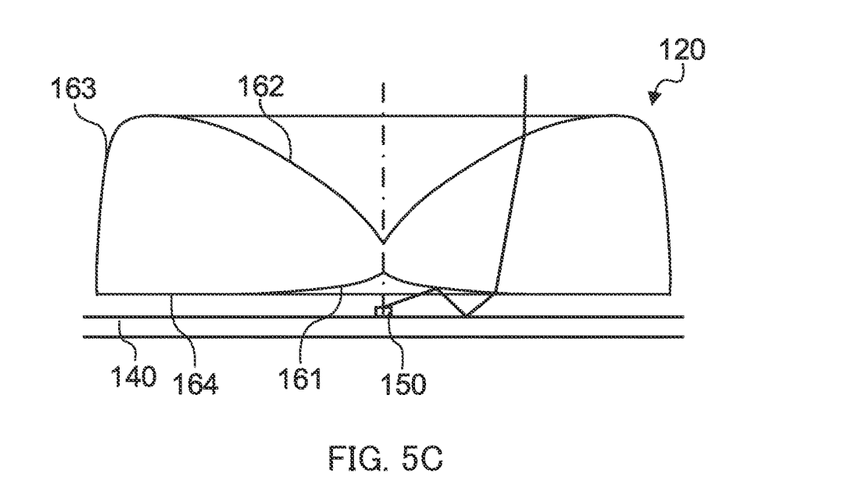

FIGS. 5A to 5C illustrates light paths of light-emitting device 120. FIG. 5A illustrates light paths of light emitted from the center of the light-emitting surface of light-emitting element 150, FIG. 5B illustrates light paths of a part of the light emitted from the center of the light-emitting surface of light-emitting element 150, and FIG. 5C illustrates light paths of another part of the light emitted from the center of the light-emitting surface of light-emitting element 150. In FIGS. 5A to 5C, hatching is omitted to illustrate the light paths of the light emitted from light-emitting element 150.

As illustrated in FIG. 5A, the light emitted from the center of the light-emitting surface of light-emitting element 150 enters light flux controlling member 160 mainly from first optical surface 161. The light entered from first optical surface 161 is internally reflected by second optical surface 162 in the direction along substrate 140. The light internally reflected by second optical surface 162 is emitted from third optical surface 163 toward the outside of light flux controlling member 160. Note that the amount of the light emitted from third optical surface 163 is larger than that of the light emitted from second optical surface 162 described later.

As illustrated in FIG. 5B, a part of the light emitted from the center of the light-emitting surface of light-emitting element 150 enters light flux controlling member 160 from first optical surface 161. A part of the light entered from first optical surface 161 is internally reflected by the light second optical surface 162 toward third optical surface 163. The light having reached third optical surface 163 is further internally reflected by third optical surface 163 toward fourth optical surface 164. The light having reached fourth optical surface 164 is internally reflected toward second optical surface 162. The light having reached second optical surface 162 is emitted from second optical surface 162 toward the outside of light flux controlling member 160. In this manner, in the light emitted from the center of the light-emitting surface of light-emitting element 150, a part of the light with a large emission angle is sequentially internally reflected by second optical surface 162, third optical surface 163 and fourth optical surface 164, and then emitted from second optical surface 162 toward the outside of light flux controlling member 160. At this time, the light emitted from second optical surface 162 travels toward light axis LA of light-emitting element 150. Note that although not illustrated in the drawings, light emitted from a region other than the center of the light-emitting surface of light-emitting element 150 can travel in a similar manner, and emitted from second optical surface 162 in some situation.

As illustrated in FIG. 5C, another part of the light emitted from the center of the light-emitting surface of light-emitting element 150 is Fresnel-reflected (externally reflected) by first optical surface 161 toward substrate 140. The light reflected by first optical surface 161 to the outside is reflected by the surface of substrate 140 toward first optical surface 161. The light reflected by the surface of substrate 140 and having reached first optical surface 161 enters light flux controlling member 160 from first optical surface 161. The light having entered light flux controlling member 160 is emitted from second optical surface 162 toward the outside of light flux controlling member 160. At this time, the light emitted from second optical surface 162 travels along light axis LA of light-emitting element 150. Note that although not illustrated in the drawings, light emitted from a region other than the center of the light-emitting surface of light-emitting element 150 can travel in a similar manner and emitted from second optical surface 162 in some situation.

Effect

As described above, according to the present invention, the light emitted from the center of the light-emitting surface of light-emitting element 150 is emitted mainly from third optical surface 163, and another part of the light emitted from the center of the light-emitting surface of light-emitting element 150 is emitted from the light second optical surface 162 toward the upper part of light flux controlling member 160, and thus, even in the case where the light-emitting surface of light-emitting element 150 is small, the light can be appropriately spread no dark point is generated in the upper part of light flux controlling member 160. Thus, the present invention is effective for local dimming.

Embodiment 2

Next, surface light source device 200 according to Embodiment 2 is described. Surface light source device 200 according to the present embodiment is different from surface light source device 100 according to Embodiment 1 only in the configuration of light flux controlling member 260 and the correspondence relationship between light-emitting element 150 and light flux controlling member 260. In view of this, in the present embodiment, the configuration of light flux controlling member 260 and the correspondence relationship between light-emitting element 150 and light flux controlling member 260 are mainly described, and the same components as those of surface light source device 100 in Embodiment 1 are denoted with the same reference numerals to omit the description thereof.

Configurations of Surface Light Source Device and Light-Emitting Device

Figure 6A:
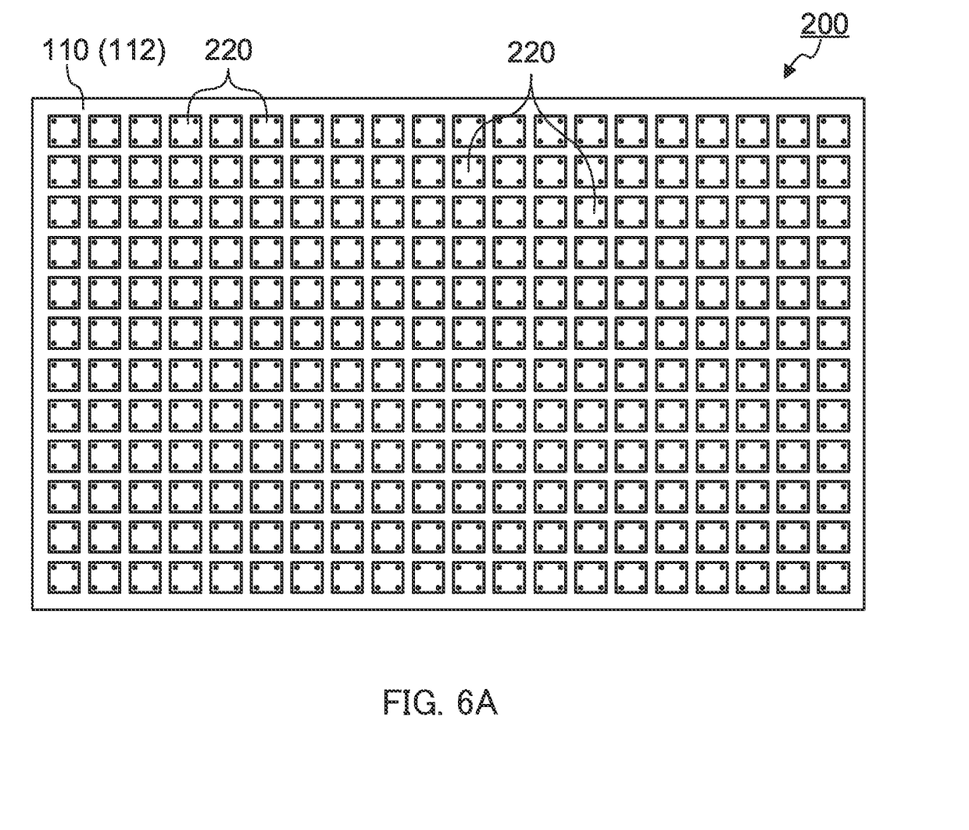
FIGS. 6A and 6B illustrate a configuration of a surface light source device according to Embodiment 2.
Figure 6B:
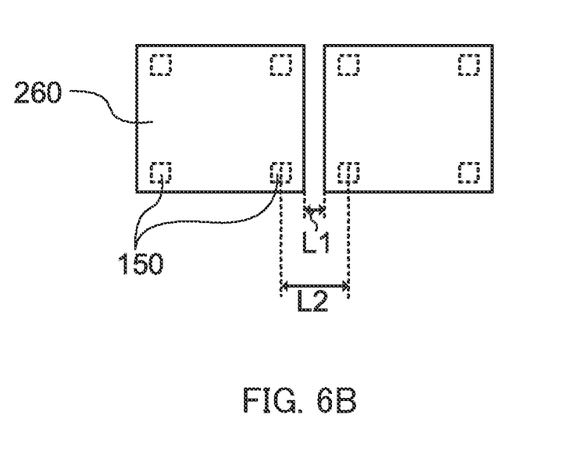

FIGS. 6A and 6B illustrate a configuration of surface light source device 200 according to Embodiment 2. FIG. 6A is a plan view of surface light source device 200 from which the light diffusion plate is detached, and FIG. 6B is a partially enlarged plan view illustrating a positional relationship between light-emitting element 150 and light flux controlling member 260.

As illustrated in FIG. 6A and FIG. 6B, in surface light source device 200 according to the present embodiment, the distribution of light emitted from a plurality of (four) light-emitting elements 150 is controlled by one light flux controlling member 260. In the present embodiment, a plurality of light-emitting elements 150 and a plurality of light-emitting devices 220 are disposed in a grid and separated from each other. Distance L1 between light-emitting devices 220 adjacent from each other may be smaller than half the center-to-center distance L2 of the plurality of light-emitting elements 150. Here "center-to-center distance L2 of the plurality of light-emitting elements 150" means the center-to-center distance between two light-emitting elements 150 belonging to different light-emitting devices 220. In this manner, light flux controlling member 260 guides the light more widely, and the darkening between light-emitting devices 220 can be suppressed.

Configuration of Light Flux Controlling Member

Figure 7A:
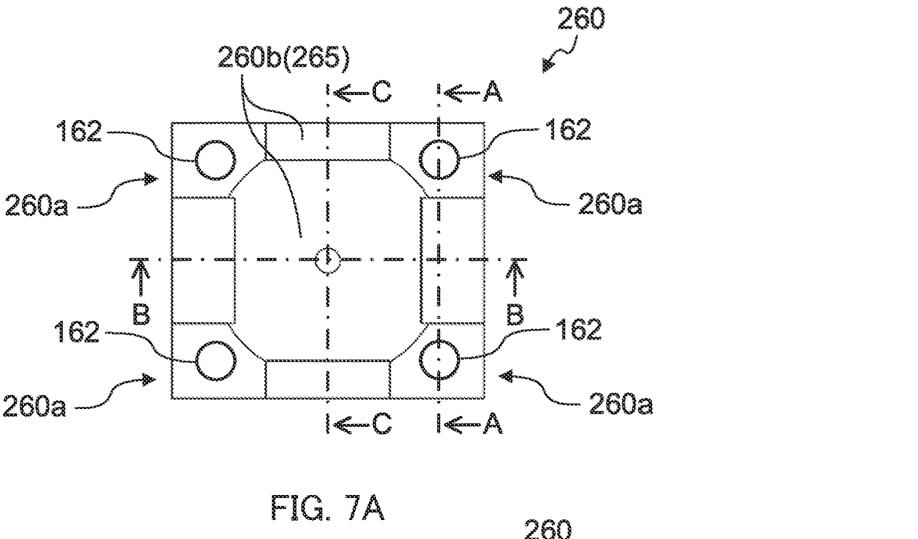
FIGS. 7A, 7B and 7C illustrate a configuration of a light flux controlling member according to Embodiment 2.
Figure 7B:
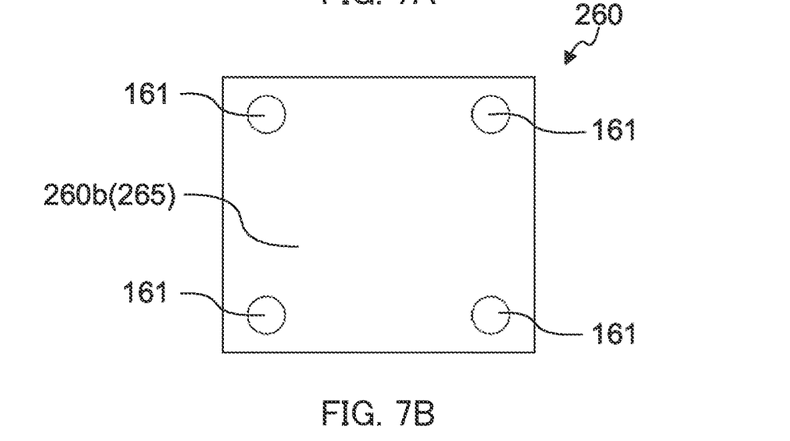
Figure 7C:
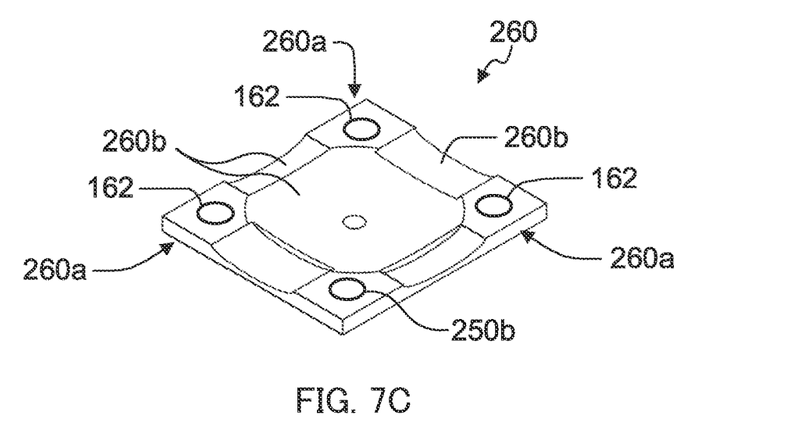
Figure 8A:
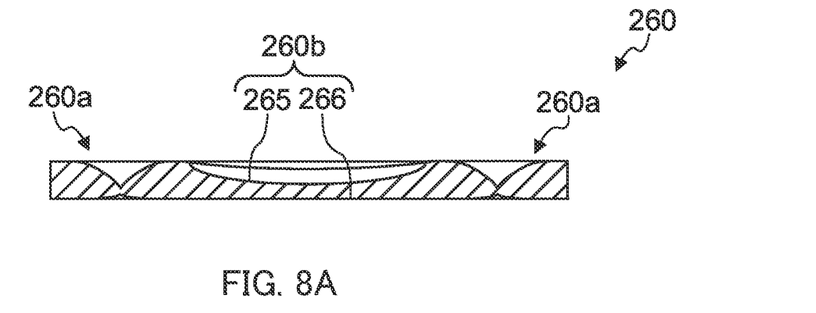
FIGS. 8A, 8B, 8C and 8D illustrate a configuration of the light flux controlling member according to Embodiment 2.
Figure 8B:
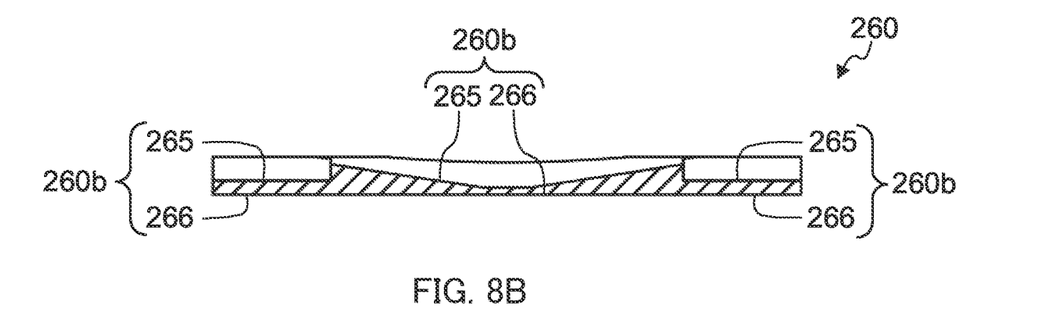
Figure 8C:
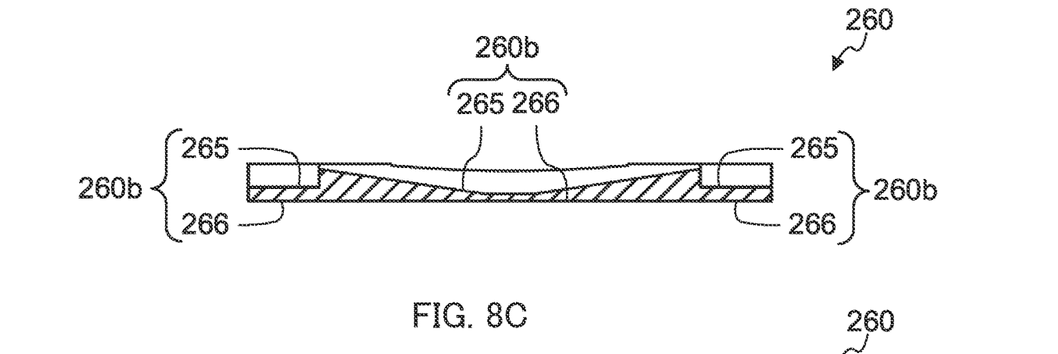
Figure 8D:
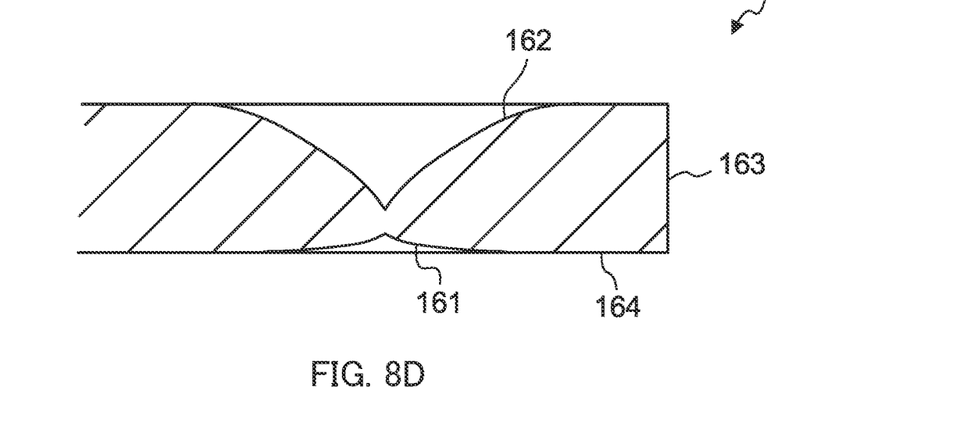

FIGS. 7A to 8D illustrate a configuration of light flux controlling member 260. FIG. 7A is a plan view of light flux controlling member 260 according to Embodiment 2, FIG. 7B is a bottom view of light flux controlling member 260, and FIG. 7C is a perspective view of light flux controlling member 260. FIG. 8A is a sectional view taken along line A-A of FIG. 7A, FIG. 8B is a sectional view taken along line B-B of FIG. 7A, FIG. 8C is a sectional view taken along line C-C of FIG. 7A, and FIG. 8D is a partially enlarged view of FIG. 8A. In FIGS. 7A to 8D, a leg part for fixing light flux controlling member 260 to substrate 140 is omitted.

As illustrated in FIGS. 7A to 8D, light flux controlling member 260 according to the present embodiment includes a plurality of incidence units 260a and emission units 260b. The plurality of incidence units 260a is disposed in a grid corresponding to the layout of light-emitting element 150. Emission unit 260b is disposed between the plurality of incidence units 260a in the direction along substrate 140. Light flux controlling member 260 includes the plurality of incidence units 260a, and light flux controlling member 260 is disposed over the plurality of light-emitting elements 150 such that first axis A1 of first optical surface 161 (second axis A2 of second optical surface 162) coincides with light axis LA of each light-emitting element 150. In the present embodiment, four incidence units 260a are disposed at corners of a virtual quadrangle, four emission units 260b are disposed at positions corresponding to the four sides of virtual quadrangle, and one emission unit 260b is disposed at a position surrounded by the virtual quadrangle.

Each of the plurality of incidence units 260a allows incidence of light emitted from light-emitting element 150, and emits and a part of the light. The plurality of incidence units 260a includes first optical surface 161, second optical surface 162, third optical surface 263, and fourth optical surface 164. The functions of first optical surface 161, second optical surface 162, third optical surface 263, fourth optical surface 164 are the same as those of Embodiment 1, and therefore the description of the functions is omitted. Note that in the present embodiment, third optical surface 163 is not disposed to surround light axis LA of light-emitting element 150. Third optical surface 163 is disposed only at the outer edge of light flux controlling member 260.

The plurality of emission units 260b emits and guides a part of light entered from the plurality of incidence units 260a. Each emission unit 260b is disposed opposite to substrate 140. Each of the plurality of emission units 260b includes reflecting surface 266 and emission surface 265. Emission unit 260b includes a portion where the distance between reflecting surface 266 and emission surface 265 decreases as the distance from incidence unit 260a increases. In this manner, as the distance from incidence unit 260a increases, the light guided from incidence unit 260a is more easily emitted from emission surface 265.

Reflecting surface 266 reflects the light internally reflected by second optical surface 162. Reflecting surface 266 is formed to be flush with fourth optical surface 164 and connected to fourth optical surface 164.

Emission surface 265 includes emission surface 265 that reflects a part of light from incidence unit 260a, and emits the other part of the light. Emission surface 265 is disposed opposite to reflecting surface 266. The shape of emission surface 265 is not limited as long as the shape includes a portion where the distance between reflecting surface 266 and emission surface 265 decreases as the distance from incidence unit 260a increases. Preferably, the shape of emission surface 265 is, for example, a curved surface or inclined surface whose distance from reflecting surface 266 decreases as the distance from incidence unit 260a increases. In the present embodiment, four emission surfaces 265 disposed at positions corresponding to four sides of the virtual quadrangle are recessed surfaces that have a curvature in the direction along the side of the virtual quadrangle, but have no curvature in the direction perpendicular to the side (see FIGS. 8A to 8C). On the other hand, emission surface 265 surrounded by the virtual quadrangle is a recessed surface composed of a part of the side surface and the upper bottom of a truncated conical shape disposed upside down (see FIG. 8B and FIG. 8C).

Light Distribution Characteristics

Figure 9A:
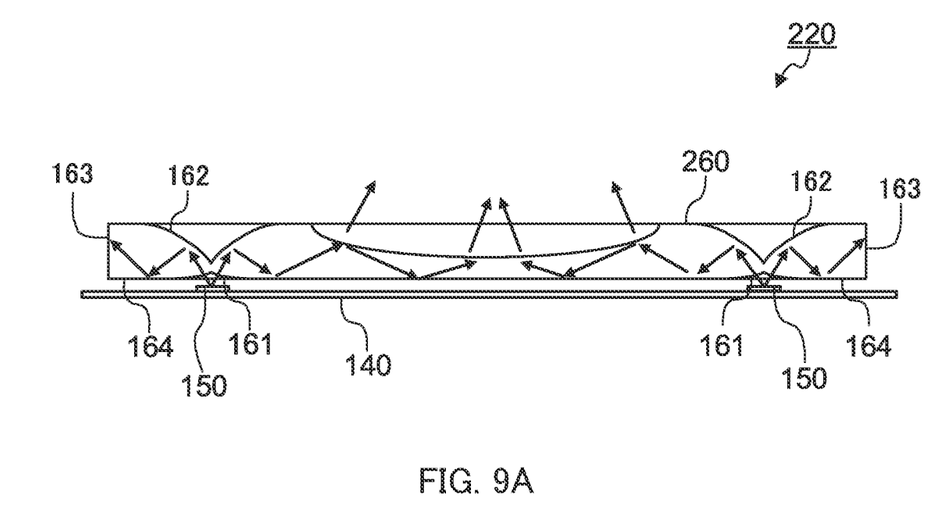
FIGS. 9A and 9B illustrate light paths of a light-emitting device according to Embodiment 2.
Figure 9B:
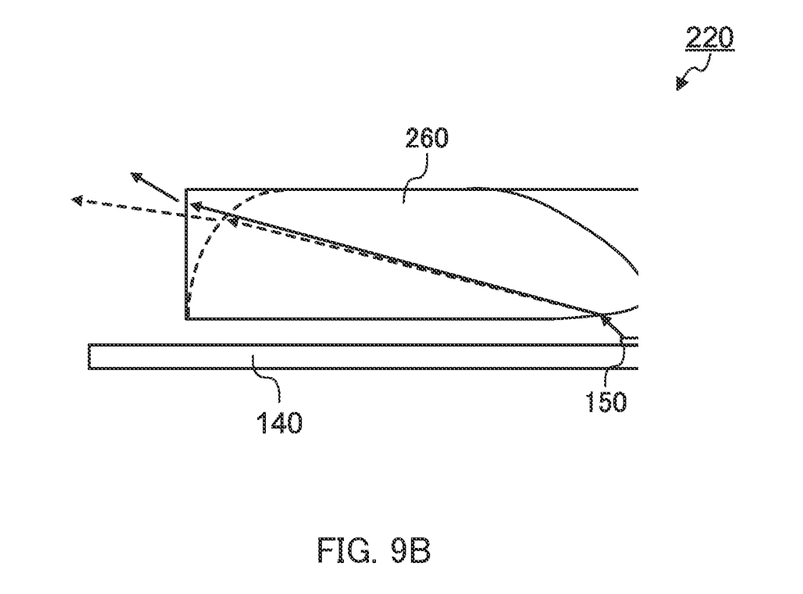

FIG. 9A illustrates light paths of light-emitting device 220. In FIGS. 9A and 9B, hatching is omitted to illustrate light paths of light emitted from light-emitting element 150 by arrows.

As illustrated in FIG. 9A, light emitted from light-emitting element 150 enters light flux controlling member 260 from first optical surface 161. A part of the light entered from first optical surface 161 directly travels toward emission unit 260b, the other part of the light is reflected by reflecting surface 266 toward emission unit 260b. The light having reached emission unit 260b is repeatedly reflected between reflecting surface 266 and emission surface 265 and is guided inside emission unit 260b. At this time, a part of the light having reached emission surface 265 is emitted from emission surface 265, without being reflected.

In this manner, the light having reached emission unit 260b travels between reflecting surface 266 and emission surface 265 of emission unit 260b and is gradually emitted from emission surface 265. Here, the distance between reflecting surface 266 and emission surface 265 decreases as the distance from incidence unit 260a increases. In this manner, the greater the distance from incidence unit 260a, the more easily the light travelling between reflecting surface 266 and emission surface 265 is emitted from emission surface 265.

In addition, the light distribution characteristics of the light emitted from incidence unit 260a are the same as the light distribution characteristics of light flux controlling member 160 of Embodiment 1, and therefore the description thereof will be omitted.

FIG. 9B illustrates a light distribution at an end portion of light-emitting device 220. As illustrated in FIG. 9B, the cross-sectional shape of an end portion of light flux controlling member 260 may be a rectangular shape or an R surface. In the case where the cross-sectional shape of the end portion of light flux controlling member 260 is an R surface, the light is more spread in the lateral direction as illustrated in FIG. 9B, and the darkening between light-emitting devices 220 where a gap is present can be prevented.

Effect

Light flux controlling member 260 of the present embodiment can control the light from the plurality of light-emitting elements 150 using one light flux controlling member 260, while achieving the effects of light flux controlling member 160 according to Embodiment 1, and thus can be readily mounted to light flux controlling member 260.

REFERENCE SIGNS LIST

100, 200 Surface light source device
100' Display device

102 Display member
110 Housing
112 Bottom plate
114 Top plate
120, 220 Light-emitting device
130 Light diffusion plate
140 Substrate
150 Light-emitting element
160, 260 Light flux controlling member
161 First optical surface
162 Second optical surface
163, 263 Third optical surface
164 Fourth optical surface
260a Incidence unit
260b Emission unit
265 Emission surface
266 Reflecting surface
A Axis
A1 First axis
A2 Second axis
A3 Third axis
A4 Fourth axis
L1 Distance
L2 Center-to-center distance
LA Optical axis

The invention claimed is:

1. A light flux controlling member configured to control a distribution of light emitted from a light-emitting element disposed on a substrate, the light flux controlling member comprising:
   a first optical surface disposed facing the light-emitting element and configured to allow incidence of light emitted from the light-emitting element;
   a second optical surface disposed on a side opposite to the light-emitting element with the first optical surface between the second optical surface and the light-emitting element, and configured to reflect, in a lateral direction, a part of light entered from the first optical surface such that the part of light entered from the first optical surface travels away from an optical axis of the light-emitting element;
   a third optical surface where a part of light reflected by the second optical surface reaches; and
   a fourth optical surface extending in a direction away from the first optical surface to surround the first optical surface, the fourth optical surface being a surface where a part of light reflected by the third optical surface reaches,
   wherein a part of light emitted from the light-emitting element and entered from the first optical surface is emitted from the second optical surface to outside of the light flux controlling member after being sequentially internally reflected by the second optical surface, the third optical surface and the fourth optical surface, and
   wherein a part of light emitted from the light-emitting element that is incident on the first optical surface is Fresnel-reflected, reflected by a surface of the substrate toward the first optical surface to enter the light flux controlling member from the first optical surface, and then emitted from the second optical surface to the outside of the light flux controlling member.

2. The light flux controlling member according to claim 1, further comprising:
   a plurality of incidence units configured to allow incidence of light emitted from a plurality of the light-emitting elements; and
   an emission unit disposed between the plurality of incidence units, and configured to emit light entered from the plurality of incidence units while guiding the light entered from the plurality of incidence units,
   wherein each of the plurality of incidence units includes the first optical surface, the second optical surface, the third optical surface and the fourth optical surface.

3. The light flux controlling member according to claim 1, wherein the second optical surface is rotationally symmetrical about the optical axis of the light-emitting element, and is configured such that a distance from the substrate increases as a distance from the optical axis of the light-emitting element increases.

4. The light flux controlling member according to claim 1, wherein the first optical surface includes a region where an incident angle of light emitted from a center of a light-emitting surface of the light-emitting element at the first optical surface is 60 degrees or greater.

5. A light-emitting device comprising:
   a light-emitting element disposed on a substrate; and
   the light flux controlling member according to claim 1 disposed over the light-emitting element.

6. A light-emitting device comprising:
   a plurality of light-emitting elements disposed on a substrate; and
   the light flux controlling member according to claim 2 disposed over the plurality of light-emitting elements.

7. The light-emitting device according to claim 5, wherein in plan view, a ratio of an area of the second optical surface and an area of a light-emitting surface of the light-emitting element is in a range of 80:1 to 5:1.

8. A surface light source device comprising:
   a plurality of the light-emitting devices according to claim 5; and
   a light diffusion plate configured to transmit light emitted from the plurality of light-emitting devices while diffusing the light emitted from the plurality of light-emitting devices.

9. The surface light source device according to claim 8, wherein a distance between the substrate and the light diffusion plate is in a range of 2 to 30 mm.

10. A display device comprising:
    the surface light source device according to claim 8; and
    a display member configured to be irradiated with light emitted from the surface light source device.

11. The light flux controlling member according to claim 2, wherein the second optical surface is rotationally symmetrical about the optical axis of the light-emitting element, and is configured such that a distance from the substrate increases as a distance from the optical axis of the light-emitting element increases.

12. The light flux controlling member according to claim 2, wherein the first optical surface includes a region where an incident angle of light emitted from a center of a light-emitting surface of the light-emitting element at the first optical surface is 60 degrees or greater.

13. The light flux controlling member according to claim 3, wherein the first optical surface includes a region where an incident angle of light emitted from a center of a light-emitting surface of the light-emitting element at the first optical surface is 60 degrees or greater.

14. The light-emitting device according to claim 6, wherein in plan view, a ratio of an area of the second optical surface and an area of a light-emitting surface of the light-emitting element is in a range of 80:1 to 5:1.

15. A surface light source device comprising:
a plurality of the light-emitting devices according to claim 6; and
a light diffusion plate configured to transmit light emitted from the plurality of light-emitting devices while diffusing the light emitted from the plurality of light-emitting devices.

16. A surface light source device comprising:
a plurality of the light-emitting devices according to claim 7; and
a light diffusion plate configured to transmit light emitted from the plurality of light-emitting devices while diffusing the light emitted from the plurality of light-emitting devices.

17. A display device comprising:
the surface light source device according to claim 9; and
a display member configured to be irradiated with light emitted from the surface light source device.

\* \* \* \* \*